Dec. 20, 1960     R. R. CARLTON ET AL     2,964,902
METHOD AND MACHINE FOR ASSEMBLING CHAIN PARTS
Filed June 27, 1956     5 Sheets-Sheet 1

INVENTORS.
RAYMOND R. CARLTON
LEWIS A. SCOTT
PETER E. MORTENSEN
BY
Buckhorn and Cheatham
ATTORNEYS INVENTORS
RAYMOND R. CARLTON
LEWIS A. SCOTT
PETER E. MORTENSEN
BY Buckhorn and Cheatham
ATTORNEYS

United States Patent Office

2,964,902
Patented Dec. 20, 1960

1

2,964,902

METHOD AND MACHINE FOR ASSEMBLING CHAIN PARTS

Raymond R. Carlton and Lewis A. Scott, Portland, and Peter E. Mortensen, Milwaukie, Oreg., assignors to Omark Industries, Inc., a corporation of Oregon Filed June 27, 1956, Ser. No. 594,318

8 Claims. (Cl. 59—7)

This invention relates to a method and machine for assembling and securing together parts of a chain, and particularly parts of a saw chain for a power saw.

Certain types of saw chains comprise center links pivotally connected in tandem relation by tie straps or side chain links disposed on opposite sides of and overlapping adjacent pairs of such center links. The pivot pins connecting the center links and side chain links are formed with an enlarged annular collar which is received within the center link and with smaller hub portions which extend through the side chain links and which are upset or peened over on the outer surface of the side links to secure the side links against the pivot pin collar. It is an object of the present invention to provide a machine for automatically assembling and securing together a pair of pivot pins and a side link of such a saw chain for subsequent assembly as a unit with other parts of the saw chain.

It is another object of the invention to provide a machine having means for selecting and orienting the pivot pins and chain links for assembly from random supplies of the same.

A further object of the invention is to provide, in a machine of the type referred to, a chain link feeding mechanism for use with chain links having a "right" and a "wrong" side relative to the pivot pins, and having means for gathering and orienting chain links from a random supply so that the chain links are all assembled with the sides thereof facing correctly relative to the pivot pins.

Another general object is to provide a new and improved method for assembling pivot pins and chain links.

Other objects and advantages of the invention will become more apparent hereinafter.

In accordance with the illustrated method and machine of the present invention, pivot pins are fed from a supply of the same into anvils having apertures which hold the pins upright and positioned to have chain links placed thereon by means provided for such purpose. The anvils are indexed past the pivot pin and chain link feeding stations to an upsetting mechanism having means for engaging and expanding the end of the pivot pin hub protruding through the chain link, all of the operations being performed automatically.

For a more detailed description of the invention, reference is made to the accompanying drawings and following description which illustrate and describe by way of example one embodiment of the present invention.

2

Figure 1:
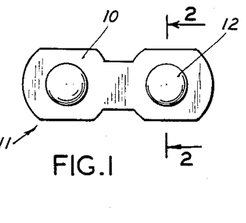
Fig. 1 is a side elevational view of a chain link and pivot pin unit such as may be assembled by a machine of the invention.
Figure 2:
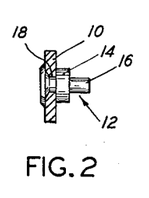
Fig. 2 is a sectional view taken along line 2—2 of Fig. 1.
Figure 3:
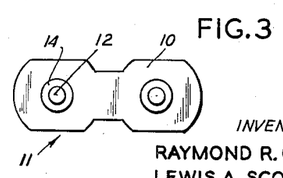
Fig. 3 is a view of the opposite side of the chain link and pivot pin unit.

The machine shown in the drawings is particularly adapted for assembling a saw chain tie strap or chain link 10 with a pair of pivot pins into a unit 11, as best shown in Figs. 1, 2 and 3, for subsequent assembly into a complete saw chain such as that shown in Cox's Patent No. 2,508,784. The stock pivot pins 12 (Fig. 10) comprise an enlarged annular central collar 14 from which extend reduced end portions or hubs 16. The chain links 10 are punched from flat metal stock or are otherwise suitably formed and are provided with a pair of longitudinally spaced openings 18 for cooperatively receiving a pivot pin hub 16, and which are flared or peened over the outer surface of the chain link as shown in Fig. 2 to secure the link against the pivot pin collar 14.

Figure 4:
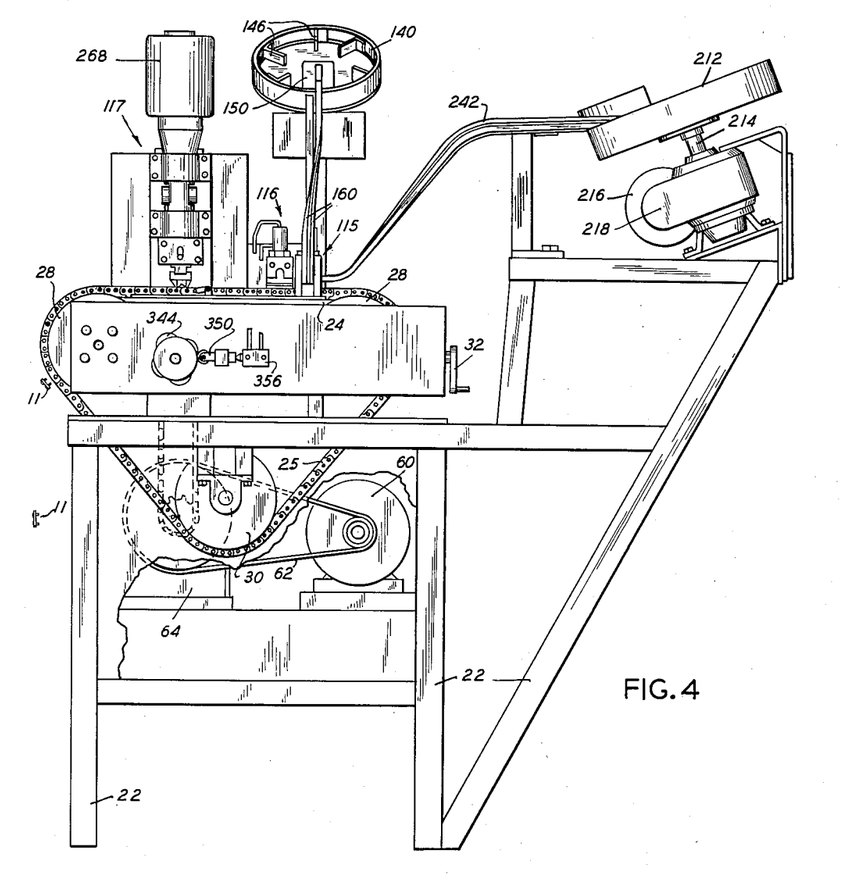
Fig. 4 is a front elevational view of a machine constructed in accordance with the invention.
Figure 5:
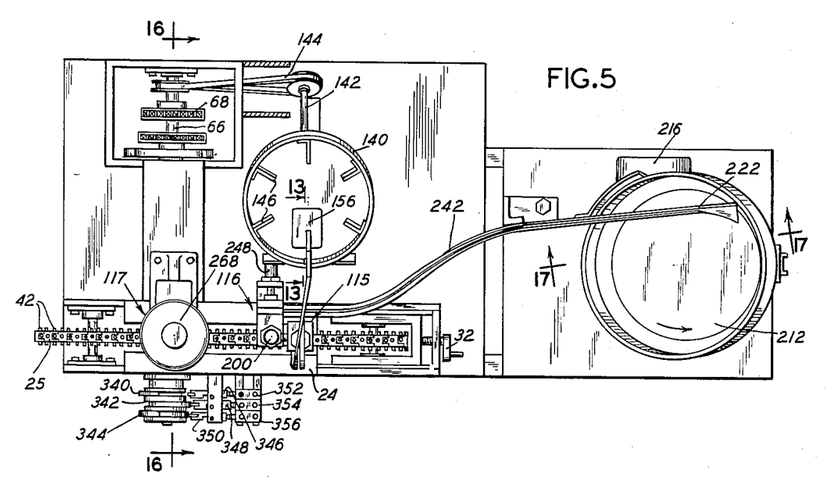
Fig. 5 is a top view of the machine.
Figures 8, 10, 11:
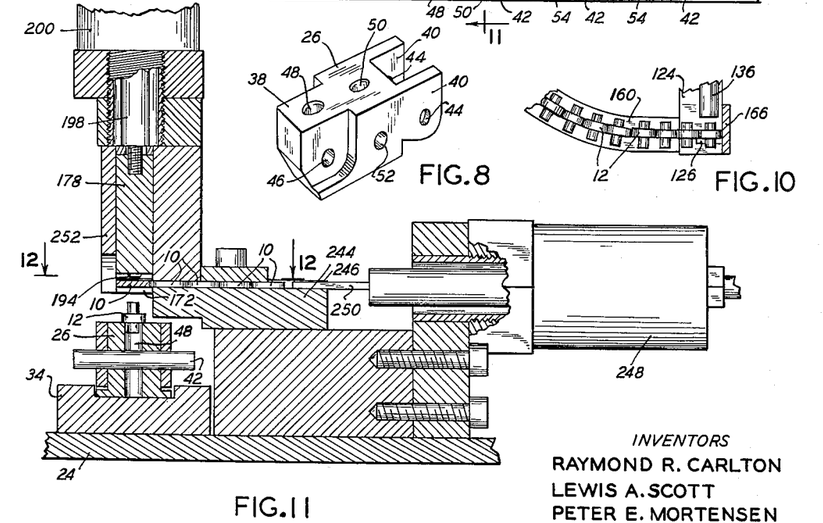
Fig. 8 is a perspective view of a pivot pin holding anvil.
Fig. 10 is a sectional view taken substantially along line 10—10 of Fig. 9.
Fig. 11 is a sectional view taken substantially along line 11—11 of Fig. 9.

Referring now more particularly to Figs. 4 and 5, the machine is illustrated as comprising a frame including legs 22 and a table 24 upon which is supported the upper reach of an endless chain or loop 25 of pivotally connected blocklike anvils 26 (Fig. 8). The chain 25 is trained over sheaves 28 mounted on the frame at opposite ends of the table 24 and a sheave 30 mounted beneath the table 24, one of the sheaves 28 being provided with means, the details of which are not shown, but including a hand wheel 32 for adjusting the tension in the chain loop. Referring briefly to Fig. 11, the table 24 is provided with a shallow, grooved, track forming member 34 in which the anvil chain 25 slides across the table toward the left as viewed in Figs. 4 and 5, the means for effecting movement of the chain being described subsequently.

Figures 9, 12:
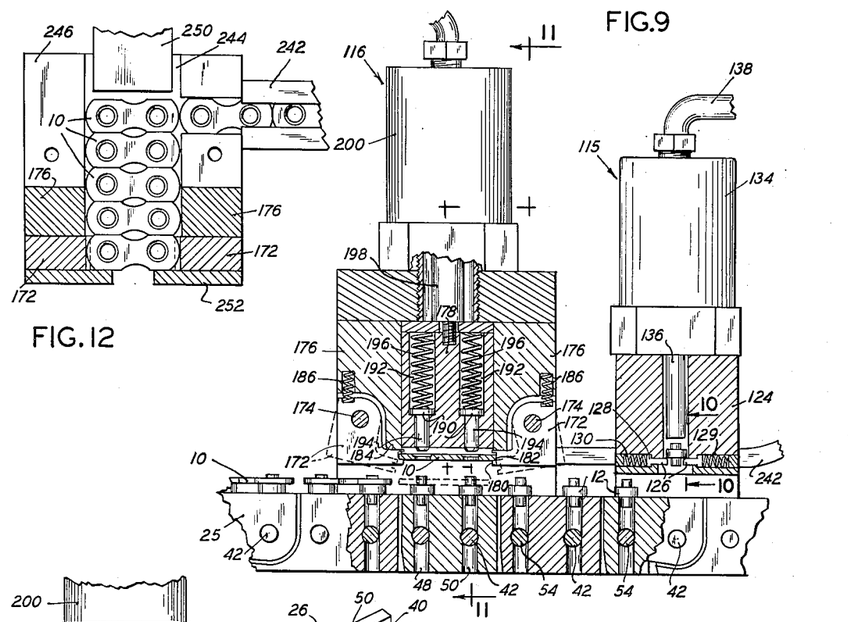
Fig. 9 is an enlarged, fragmentary elevational view of the pivot pin and chain link feed mechanisms.
Fig. 12 is a sectional view taken substantially along line 12—12 of Fig. 11.

As may be best seen in Figs. 8 and 9, the anvils 26 are identical with one another, each being generally rectangular in outline and having, with reference to its position on the table 24, flat upper and lower surfaces, the forward end of each link being recessed at its opposite sides to form a nose 38 of lesser width than the remaining portion of the link. The rearward end of each link is formed with ears 40 between which is received the nose of the following anvil of a chain. The anvils are pivotally connected together by indexing or hinge pins 42 which extend through openings 44 in the ears 40 and an opening 46 in the anvil nose 38 positioned between the ears. The pins 42 are of a length greater than the width of the anvils and extend outwardly on each of the opposite sides of the anvils for a purpose to be described hereinafter. Each anvil 26 is supplied with a pair of vertical apertures in its upper surface of a diameter slightly greater than that of a pivot pin hub 16, one of the apertures 48 being aligned vertically with the axis of the nose opening 46, the other aperture 50 being spaced exactly midway between the nose opening 46 and the ear openings 44 of an anvil so that all of the apertures in the portion of the chain 25 supported on the table 24 will be spaced apart equidistantly. Each anvil is also provided with a further transverse opening 52 extending through the anvil body in alignment with the aperture 50, and through which extends an indexing pin 54 of a length greater than the width of the body so that it projects outwardly on the opposite sides of the anvil body in a manner similar to the anvil connecting pins 42.

Figure 6:
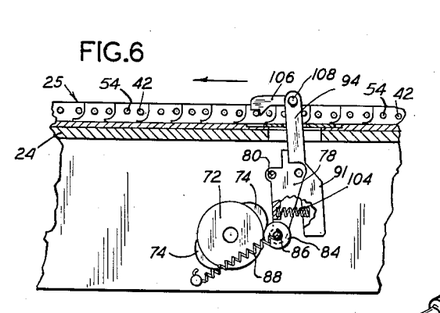
Fig. 6 is a sectional view illustrating a part of the mechanism for indexing the pivot pin holding anvils, the view being taken substantially along line 6—6 of Fig. 16.
Figures 16, 21, 22, 23, 24:
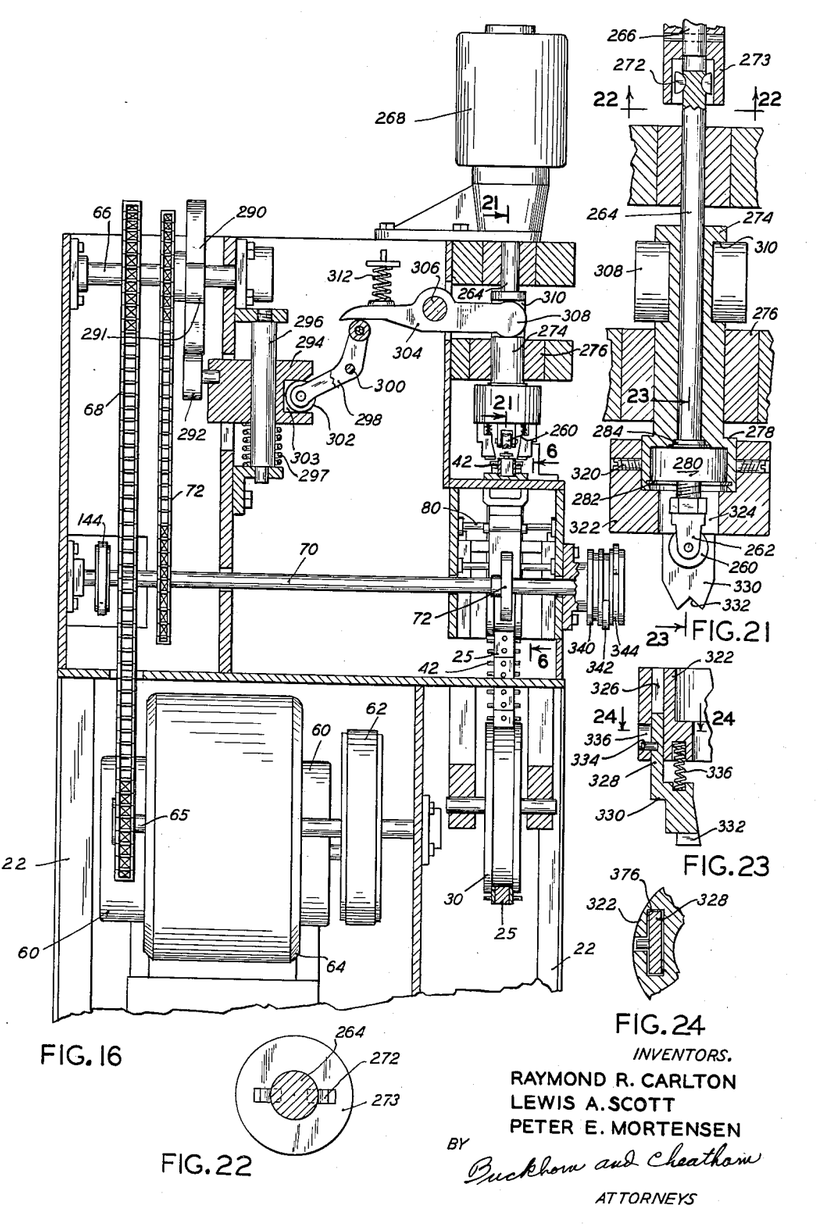
Fig. 16 is an enlarged sectional view taken substantially along line 16—16 of Fig. 5 showing details of the drive connections and pivot pin spinning head.
Fig. 21 is an enlarged sectional view taken substantially along line 21—21 of Fig. 16.
Fig. 22 is a sectional view taken along line 22—22 of Fig. 21.
Fig. 23 is an enlarged, fragmentary sectional view taken along line 23—23 of Fig. 21.
Fig. 24 is a fragmentary sectional view taken along line 24—24 of Fig. 23.
Figure 17:
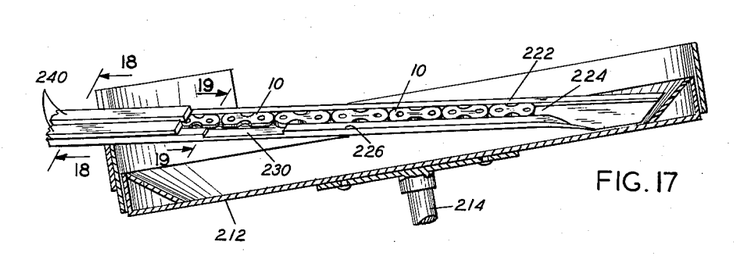
Fig. 17 is an enlarged sectional view taken substantially along line 17—17 of Fig. 5 showing details of the chain link supply mechanism.

Means are provided for indexing the anvils across the table 24 in steps or increments of a distance equal to the spacing between the apertures 48, 50. Suitably mounted on the lower portion of the frame is a motor 60 connected by suitable means such as a belt 62 to a gear reduction box 64. The output shaft 65 of the gear box 64 is connected to a jack shaft 66 by a sprocket chain 68, trained over suitable sprockets on the output shaft 65 and jack shaft 66. The jack shaft 66 is drivingly connected to a time shaft 70 by another sprocket chain 72 trained over suitable sprockets provided therefor on the jack shaft and time shaft. Fixed to the time shaft 70, which passes beneath the table 24 as may be seen in Fig. 16, is an indexing cam 72 having two diametrically spaced lobes 74, as shown in Fig. 6. The lobes 74 are adapted to effect actuation of an indexing arm assembly, more clearly shown in Figs. 6 and 7. Such assembly comprises a lever member 78 pivotally supported at its upper end by a horizontal rod 80 (Fig. 16) suitably secured to the machine frame and extending through an opening 81 in the lever member. The lower end of the lever member 78 is provided with a pair of laterally spaced ears 82 between which is mounted a roller 84 supported on a pin 86 which extends through cooperative openings in the ears 82 and roller 84. The pin 86 extends outwardly from each of the opposite sides of the lever member 78 and is engaged at each of its opposite ends by springs 88 (Fig. 6), only one of which is shown, suitably anchored at one end to the machine frame to bias the roller 84 against the indexing cam 72. The side of the lever member 78 facing away from the cam 72 is provided with a pair of laterally spaced flanges 90 (Fig. 16) between which is received the tongue 92 of an indexing arm having a pair of forks 94 extending upwardly through openings in the table 24 on each of the opposite sides of the anvil chain 25. The tongue 92 is pivotally mounted between the flanges 90 by a pivot pin 96 extending through openings 98 in the flanges and an opening 100 in the tongue. The lower part of the forks 94 is biased into engagement with a stop 102 formed on the upper part of the lever member 78 by means of a relatively strong compression spring 104, the purpose of which will be discussed subsequently.

Mounted by one end on each of the forks 94 is an indexing finger 106, the fingers being mounted for free pivotal movement by suitable means such as cap screws 108 and being positioned over the protruding ends of the anvil pins 42, 54. The fingers 106 are each provided with a projection on their lower surfaces defining an abrupt shoulder 110 facing the free end of the finger and a sloping surface 112 on the opposite side. Referring now to Fig. 6, as the cam 72 revolves, engagement of a lobe 74 with the roller 84 causes the lever member 78 to pivot about the rod 80. The spring 104 is preferably of such strength as to resist compression in the normal operation of the machine whereby the lever arm 91 and lever member 78 pivot as a unit so that the upper part of the lever arm moves in the direction of the arrow in Fig. 6. This movement of the lever arm causes the indexing fingers to move in the same direction, causing the shoulders 110 thereof to engage the opposite, protruding ends of the anvil pivot pin 42 or indexing pin 54 immediately forward of the shoulders as the case may be, to push or index the anvil chain a distance equal to the movement effected by the cam lobe 74. As a cam lobe 74 moves downwardly past the roller 84, the springs 88 cause the lever member 78 and indexing arm 91 to return to their original position. As the indexing fingers are moved rearwardly, the engagement of the sloping surfaces 112 with the anvil pins 42 or indexing pins 54 causes the fingers to ride up and over such pins and to drop between the next succeeding pair of pins. The indexing mechanism just described is so arranged as to move or index the chain 25 the exact distance between the anvil apertures 48, 50. In the event something jams the anvil chain 25 to prevent its movement, the spring 104 compresses so that the lever arm 91 may remain stationary, thus preventing injury to the machine.

The anvil chain provides means for holding the pivot pins 12 and chain links 10 as they are assembled and secured together into the unit 11 shown in Figs. 1 to 3 and previously described. Generally speaking, the operations of the machine are performed automatically at three stations including, first, a pin feed station, indicated generally in Figs. 4 and 5 at 115, and where pins are fed into the anvil apertures 48, 50 as the anvils 26 are indexed past the station. The anvils 26 with the pins therein pass next to a chain link feed station, indicated at 116, having means for feeding a chain link onto the upwardly extending hubs 16 of the pivot pins held in the anvils passing the station. At the third and final station, indicated at 117, the ends of the rivet hubs 16 protruding above the chain links 10 are upset or expanded over the chain links. The mechanisms for performing these operations will now be described in detail.

Referring now to Figs. 9 and 10, the pivot pin feed station 115 is provided with means for holding a pivot pin in vertically aligned position above an anvil aperture 48, 50 in the rest position of the anvil 26, such means including a pair of guide blocks 124 spaced apart a distance just slightly greater than the diameter of a pin collar 16 to define a channel therebetween. Mounted in opposed relation in the guide blocks 124 is a pair of fingers 126 which project from the corresponding guide block a slight distance so that the fingers may engage under the collar 14 of a pivot pin positioned between the blocks and support the pin as shown in Fig. 9. The fingers 126 are each formed with an enlarged head 128 slidably received in a bore 129 formed in the corresponding block and defining a shoulder which engages the head 128 to limit the protrusion of the fingers. Springs 130 are provided to bias the head 128 into engagement with the bore shoulder. The inner ends of the fingers 126 are slightly chamfered as shown in Fig. 9 so that as a pivot pin 12 is pushed downwardly the fingers will be cammed back into the blocks and out of the path of the pivot pin. Mounted over the blocks 124 is an air motor 134 (the details of which are not shown) having a push rod 136 adapted to move downwardly from the position shown in Fig. 9 upon actuation of the air motor to push a pivot pin 12 past the fingers 126 and into the anvil aperture positioned below. The air motor 134 is connected to a suitable source of air pressure by a hose indicated at 138.

Figures 13, 14:
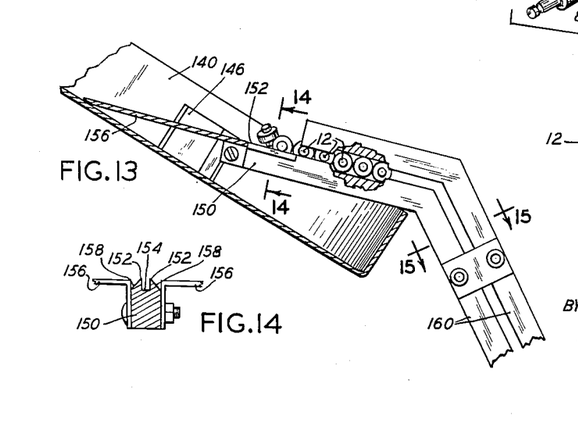
Fig. 13 is an enlarged, fragmentary sectional view taken substantially along line 13—13 of Fig. 5 showing details of the apparatus for supplying pivot pins to the pivot pin feed mechanism.
Fig. 14 is a sectional view taken along line 14—14 of Fig. 13.

Means are provided for feeding pivot pins 12 into position on the fingers 126 including a pan 140 mounted slightly above the table 24 and to the rear thereof. As shown in Figs. 4 and 5, the pan is tilted slightly forwardly and is rotatably supported at the center of its bottom on a shaft 142 suitably mounted on the machine and adapted to be driven from the time shaft 70 by suitable means including a belt indicated at 144. The pan 140 is adapted to retain a random supply of pivot pins 12 and is provided with a plurality of baffles 146 extending inwardly on the sides of the pan for engaging pivot pins in the pan and carrying them upwardly toward the upper side of the pan as it is rotated to the point where they can tumble free of the baffles and back down toward the lower side of the pan. Mounted over the pan 140 in position to intercept the tumbling pins is a pick-up member 150, best shown in Figs. 13 and 14, formed to define a pair of parallel shoulders 152 inclined downwardly toward the lower side of the pan and spaced to define a groove 154 of a width just slightly greater than the width of the pivot pin collar 14, whereby pivot pins tumbling upon the pick-up member and falling with the collar thereof engaged in the groove 154 will roll upon the pin hubs 16 downwardly of the member toward the lower edge of the pan. A baffle plate 156 is preferably secured to the upper end of the pick-up member to guide the tumbling pins to the pick-up member. The outer edges of the shoulders 152 may be sloped, as indicated at 158, so that pins not falling in the desired position upon the pick-up member will immediately fall to one side back into the pan 140 and clear the pick-up member.

Figures 7, 15:
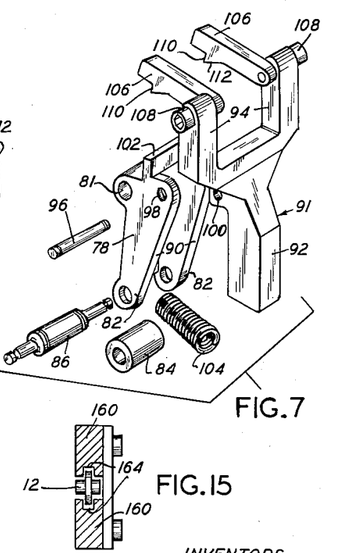
Fig. 7 is an enlarged, exploded, perspective view of the anvil indexing mechanism.
Fig. 15 is a sectional view taken along line 15—15 of Fig. 13.

The pick-up member 150 is formed as an extension of a guide way through which the pivot pins may roll and slide to the pivot pin feed station 115, previously described. As shown in Fig. 15, the guide way comprises a pair of opposed members 160 spaced apart a distance slightly greater than the diameter of the pin hubs 16, each of the members having a groove 164 for receiving the pivot pin collars 14. The members 160 curve downwardly with a half twist so that the pins may slide outwardly from between the members 160 into an upright position above the fingers 126, and between the guide blocks 124, as best shown in Fig. 10, a stop plate 166 being mounted on the back side of guide blocks 124 and against which a pivot pin is held by the pressure of the succeeding pivot pins in a guide way. Immediately upon return of the motor push rod 136 after ejection of a pivot pin, the pivot pin 12 in the guide way adjacent to the fingers 126 will be pushed into position thereover by the pressure and weight of the pivot pins in the guide way.

The chain link feed station 116 is provided with means for holding a chain link 10 over the anvils 26 with the openings 18 of the link in vertical alignment with the apertures 48, 50 of the anvil beneath the link in the rest position of the anvil. The openings of the chain link will, of course, be axially aligned with the upwardly facing hubs 16 of the rivets positioned in the anvil apertures 48, 50, as best shown in Fig. 9. The chain links are releasably held between a pair of dogs 172 mounted on horizontal pivots 174 supported on a pair of spaced guide blocks 176 between which a pusher block 178 is mounted for vertical movement. The dogs 172 are each formed with noses 180 which extend substantially horizontally toward each other in the normal position of the dogs, as shown in solid lines in Fig. 9, in which the dogs are biased by springs 186 against stops 184 formed on the guides 176. Each of the noses 180 is formed with a horizontal notch 182 of greater height than the link thickness and into which a chain link is inserted, in a manner to be later described, and supported, as shown. Mounted in the pusher block 178 are a pair of guide pins 190 having enlarged heads vertically slidable in bores 192 provided in the pusher block and having shanks 194 of reduced diameter protruding slightly below the lower surface of the pusher block, the shanks being of slightly smaller diameter than the openings 18 of the chain links and positioned in the pusher block so as to be in alignment with the openings of a chain link held in the dogs 172. Springs 196 are provided to bias the guide pins outwardly of the pusher block, as shown. The pusher block 178 is secured to the piston 198 of an air motor 200 supported on and above the guides 176, the motor being arranged to effect downward movement of the pusher block when actuated so as to engage a chain link held in the dogs 172 and force it downwardly. This downward movement of the chain link will cause the dogs 172 to pivot outwardly, as shown in dotted lines in Fig. 9, permitting the chain link to clear the dog nose notches 182 and to fall upon the upwardly extending hubs 16 of the pivot pins centered therebeneath. The guide pin shanks will enter the chain link openings 18 as the pusher block 178 moves downwardly to hold the chain link in proper alignment with the pivot pins 12. As the pusher block 178 returns to its normal position, the springs 186 will cam the dogs 172 back against the stops 184 and into position to receive another chain link, which is fed thereto by a means now to be described with particular reference to Figs. 17 to 20, inclusive.

Figures 18, 19, 20:
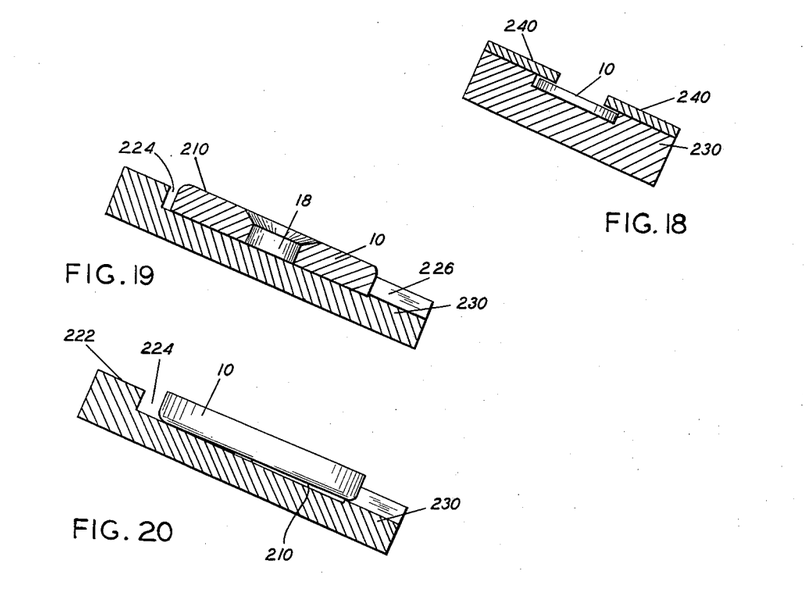
Fig. 18 is an enlarged sectional view taken along line 18—18 of Fig. 17.
Fig. 19 is a sectional view taken substantially along line 19—19 of Fig. 17.
Fig. 20 is a further sectional view taken along line 19—19 of Fig. 17 further illustrating the function of this portion of the machine.

As previously indicated, the chain links 10 are preferably formed by blanking the same from flat metal stock by means of cooperatively formed dies. As is well known, the movement of the die through the stock will cause the edges of the stock first engaged by the die to be rounded whereas the edges on the opposite side of the piece will be square. The side of the piece having the rounded edges is normally known as the compression side and is indicated in Fig. 19 by the numeral 210. Preferably the chain links are assembled in the saw chain with the compression side of chain links facing outwardly since the opposite flat side of the links present more bearing surface to the adjacent links of the saw chain. Also, the chain link openings 18 are preferably countersunk, as shown in Figs. 2 and 19, to provide space into which the metal of the flared end of the pivot pin hub 16 may be forced, thus minimizing the amount of metal which extends beyond the surface of the chain links. The rounded edges of the compression side 210 of the links 10 provide a convenient means for automatically aligning the chain links 10 with the identical side up by the mechanism now to be described. The chain link aligning mechanism includes a pan 212 rotatably supported on a shaft 214 driven by a motor 216 through a gear reduction box 218, as indicated in Fig. 4. The bottom of the pan 212 is inclined so that as the pan is rotated chain links therein will be carried toward the top to eventually tumble downwardly towards the lower edge of the pan. Extending over the pan to one side of the center thereof is an elongate assembly bar 222 formed with a longitudinally extending groove 224 in its upper surface of slightly greater width than the width of the chain links 10, the groove being defined on its lower side by a ridge or shoulder 226. The assembly bar 222 is inclined longitudinally downwardly towards the lower side of the pan 212 and is also inclined sideways. The upper end of the assembly bar 222 is flared as shown in Fig. 5 and is positioned adjacent the bottom of the pan so that the chain links piled therein will be scraped onto the bar. Some of the chain links will fall into the groove 224 and will be moved downwardly end-to-end along the shoulder 226 under the impact of the links being scraped onto the bar and striking the hindmost link in the groove. Near the lower part of the pan 212, the height of the groove shoulder 226 is reduced over a portion 230 having a length greater than the length of the chain links 10, the height of the reduced shoulder portion being about two-thirds as great as the radius of the curvature on the edges of the compression side of the links 10. The shoulder 230 will engage the lower, square edges of chain links 10 sliding down the groove 224 with the compression side 210 up so as to retain such chain links in the groove, as indicated in Fig. 19, and prevent their falling off into the pan. However, a chain link with its compression side 210 down will tend to ride up and over the reduced shoulder 230, as shown in Fig. 20, permitting the chain link to escape from the groove and fall back into the pan 212. Thus, all of the chain links passing beyond the reduced shoulder portion 230 will be faced with the compression side up.

Immediately beyond the reduced shoulder portion 230, rails 240 extending over the opposite sides of the groove 224 are provided to retain the chain links within the groove as they slide on down the track 242 thus formed. The track 242 is gently curved downwardly so as to lead the chain links one by one into a position immediately behind the dogs 172 of the chain link feeding station. Referring to Figs. 11 and 12, the chain links 10 slide out of the track 242 onto a receiving plate 244 up against a stop 246. The plate 244 is aligned with the dog notches 182 and means are provided for pushing the chain link from the plate into position between the dogs, such means including an air motor 248 having a pusher plate 250 arranged to slide on the receiving plate 244 towards the dogs upon actuation of the motor. A back plate 252 is mounted on the guides 176 for engaging the chain link when it is pushed into position between the dogs 172 directly over and in the desired alignment with the anvil apertures 48, 50. The means for effecting operation of the air motor 248 will be described subsequently.

Referring now most particularly to Figs. 16, 21, 22 and 23, the upsetting or expansion of the pivot pins is accomplished by means of a conventional spinner roll 260 which is supported in a suitable holder 262 in position to be lowered upon a pivot pin and to revolve about the axis of the pin as the roll is pressed thereon so as to cause the metal to flow into the countersink of the chain link 10 and over the side thereof, as shown in Fig. 2. The holder 262 is secured to the end of a spindle 264 drivingly connected to the shaft 266 of a motor 268 by means of a splined collar 273 (Fig. 22) secured to the motor shaft and keys 272 engaging the collar splines and slots in the spindle, whereby the spindle can move axially relative to the motor shaft to permit raising and lowering the spinner roll. The spindle 264 is surrounded by a sleeve 274 slidably supported in a support arm 276 fixed to the frame of the machine. The sleeve 274 extends both above and below the support arm 276, the portion extending below the support arm being enlarged to define a shoulder 278 adapted to engage the under side of the support arm 276 and limit upward movement of the sleeve. The spindle 264 is supported within the sleeve 274 by means of a bearing 280 held within the enlarged portion of the sleeve 274 by retaining ring 282. An integral collar 284 is provided on the spindle 264, immediately above the bearing 280, to lock the spindle and sleeve 274 against relative axial movement whereby raising or lowering of the sleeve by means to be described effects corresponding raising or lowering of the spindle.

Reciprocation of the sleeve 274 is obtained through mechanism, best shown in Fig. 16, including a cam 290 having two lobes 291 fixed to the jack shaft 66 and bearing against a roller 292 secured to a shoe 294 mounted on a vertical slide rod 296. As a lobe 291 of the cam 290 engages the roller 292, the shoe 294 is moved downwardly and as the cam lobe moves past the roller 292, the shoe moves back upwardly under the bias of a spring 297. The movement of the shoe 294 imparts reciprocating motion to a rocker arm 298 pivotally mounted at its center 300, the rocker arm having a roller 302 engaged within a slot 303 in the shoe 294. The opposite end of the rocker arm bears against one end of a lever 304 pivotally mounted on a pivot rod 306, the opposite end of the lever being bifurcated with the furcations or arms 308 fitting grooves 310 formed on the opposite sides of the sleeve 274, as most clearly shown in Fig. 21. A spring 312 is arranged between the lever 304 and the frame of the machine to bias the end of the lever engaged by the rocker arm downwardly. As will be observed from Fig. 16, when the shoe 294 moves downwardly and the upper end of the rocker arm 298 moves to the left, the lever 304 will pivot, moving the lever arms 308 downwardly and which, by reason of their engagement with the bottom of the sleeve groove 310, will cause the sleeve 274 to move downwardly to effect lowering of the spinner roll into engagement with the end of a pivot pin centered therebeneath. As the cam 290 revolves and the shoe 294 raises, the rocker arm 298 will return to its original position whereupon the spring 312 will force the end of the lever in engagement with the rocker arm, that is, the left end of the lever, down to raise the lever arms 308 and which, by reason of their engagement in this instance with the upper side of the grove 310, will cause the sleeve 274 and consequently, the spinner roll 260, to raise. Thus, the spinner roll 290 is lowered and raised twice during each revolution of the jack shaft 66.

Means are provided to engage the anvil 26 holding the pivot pin 12 being spun to hold the anvil securely against the bottom of the track member 34 with the pivot pin centered beneath the spinner roll 260. Secured to the enlarged portion of the sleeve 274 by suitable means such as setscrews 320 is an annular body 322 having a central bore 324 through which the spindle 264 extends. The body 322 is provided with a pair of axially parallel slots 326 spaced on opposite sides of the anvil chain 25 and in which slots are received the shanks 328, see Fig. 23, of a pair of hold down members 330 having toothed ends defining a notch 332 adapted to fit over and engage with the sides thereof the anvil connecting pin 42 or indexing pin 54, as the case may be, which is opposite the pivot pin 12 being flared. If the anvil is slightly out of position, the hold down members will cause it to center beneath the spinner roll 260. To limit the movement of the hold down members 330, a pin 334 is fixed to each and which rides within slots 336 formed in the body 322. The hold down members are biased downwardly relative to the body 322 by springs 337 arranged between the body 322 and a shoulder formed by an offset on the hold down member 330. The springs take up the shock upon engagement of the hold down member with the pins of the anvil chain 25 and prevent injury to such pins.

The cams and levers effecting movement of the spinner roll 260 are correlated with the anvil chain indexing mechanism to lower and raise the spinner roll between each indexing step of the anvil chain so that the spinner roll will be lowered upon each pivot pin as it comes beneath the spinner roll. Likewise, means are provided for correlating the action of the air motors 134, 200 and 248 so as to effect feeding of the pins and chain links at the proper time. With reference to Figs. 5 and 16, mounted on the time shaft 70 are two cams 340 and 342, each having a single lobe and a third cam 344 provided with two diametrically opposed lobes, the cams being engaged by cam followers 346, 348 and 350, respectively. The cam follower 346 is arranged to operate the control means indicated at 352 for the air motor 200 of the chain link feed station and the cam follower 348 is arranged to operate the control means 354 for the air motor 248 of the chain feed station. The cam follower 350 is arranged to operate the control means 356 of the motor 134 of the pivot pin feed station. Details of the control arrangements are not shown because they are conventional. Suffice it to say that upon operation of a particular controller, a particular air motor functions in the manner previously described to perform the operation for which it is provided.

It will be observed that for each revolution of the time shaft 70, the air motor 134 at the pin feeding station 115 will be twice actuated whereas the motors 200 and 248 at the chain link feed station will be operated only once. As has been previously mentioned, complete rotation of the time shaft 70 also causes two indexing steps of the anvil chain 25. The cam 344 is positioned relative to the indexing cam 72 such that pin feeding movement of the motor 134 takes place immediately after each advancing movement of a chain and before the next advancing step begins. The cam 340, on the other hand, is arranged so that the motor 200 is actuated to eject a chain link only after every second or every other advancing step of the anvil chain and at such time as an anvil 26 is positioned squarely beneath the chain link held in the dogs 172. The cam 342 is arranged to effect actuation of the motor 248 at some interval after the motor 200 has operated to eject a chain link and the pusher block 178 has returned to position, and before the next succeeding time for actuation of the motor 200. Thus, movement of all of the feeding and spinning mechanisms is correlated.

The operation of the machine may be briefly summarized by particular reference to Figs. 4 and 9. Upon starting of operation of the machine, the chain 25 will be advanced in steps of equal length across the table 24. Between each advancing step of the chain, a pivot pin 12 will be fed into an aperture 48 or 50 of the anvil positioned at the pivot pin feeding station 115. The anvils 26 with the pivot pins therein will advance towards the chain link feeding station 116 and when an anvil comes to rest position beneath the chain link feeding station, a chain link 10 will be dropped upon the pivot pins held in the anvil. The anvil 26 will then continue to advance towards the spinning station 117 and as each pin comes to rest beneath the spinner roll 260, the spinner roll will be lowered to engage the protruding hub of the pivot pin to expand it over the side of the chain link resting thereon. As the anvil chain passes over the sheave 28, the assembled chain link-pivot pin units will fall free of the anvils, as shown in Fig. 4, and may be collected in a suitable container (not shown) therebeneath.

Having illustrated and described a preferred embodiment of the invention, it should be apparent to those skilled in the art that the invention permits of modification in arrangement and detail. We claim as our invention all such modifications as come within the true spirit and scope of the appended claims.

We claim:

1. In a machine for assembling saw chain parts, the combination comprising, an anvil chain including a plurality of identical anvil blocks of generally rectangular outline, said blocks each having a flat upper surface and a parallel lower surface for sliding along a horizontal supporting surface, one end of each of said anvil blocks having a portion of reduced width and the other end being bifurcated, said anvil blocks being arranged in end-to-end relation with the reduced end portion of each anvil block positioned between the furcations of an adjacent anvil block, a plurality of hinge pins extending one through the furcations of each anvil block and the reduced anvil block end portion positioned therebetween and hingedly connecting said anvil blocks, said hinge pins having portions extending outwardly on each of the opposite sides of said anvil blocks, auxiliary pins positioned midway between said hinge pins and also having portions extending outwardly on each of the opposite sides of said anvil blocks, indexing means including an element movable alternately in opposite directions longitudinally of said anvil chain for engaging said portions of said pins to move said anvil chain in steps equal to the distance between said openings, each of said blocks having a pair of saw chain pivot pin receiving openings in the said upper surface thereof spaced apart one half the spacing of said hinge pins, the space between the openings in the ends of adjacent blocks being the same as that between the openings of each block.

2. In a machine for assembling chain parts the combination comprising an anvil chain including a plurality of identical anvil blocks of generally rectangular outline, said blocks each having a flat upper surface and a parallel lower surface for sliding along a horizontal supporting surface, one end of each of said anvil blocks having a portion of reduced width and the other end being bifurcated, said anvil blocks being arranged in end-to-end relation with the reduced end portion of each anvil block positioned between the furcations of an adjacent anvil block, a plurality of hinge pins extending one through the furcations of each anvil block and the reduced anvil block end portion positioned therebetween and hingedly connecting said anvil blocks, said hinge pins extending outwardly on each of the opposite sides of said anvil blocks for engagement by indexing means, an indexing pin extending through each of said blocks parallel to said hinge pins medially between the hinge pins of such block and extending outwardly on each of the opposite sides of said block, and each of said blocks having a pair of saw chain pivot pin receiving openings in the said upper surface thereof spaced apart one half the spacing of said hinge pins.

3. In a machine for assembling units consisting of a pair of pivot pins having an enlarged central collar and opposite hubs of reduced diameter and a chain link having spaced openings for receiving said pin hubs, the invention comprising a plurality of anvils hingedly connected together in a continuous loop, means supporting said anvil chain in a vertical loop with a portion of the chain extending in an upper horizontal run, each of said anvils having a pair of spaced openings therein extending vertically in the horizontal run of said anvil chain for receiving the hubs of pivot pins, indexing pins extending outwardly from the opposite sides of said anvils adjacent each of the apertures therein at right angles to the longitudinal line of said anvil chain and to the axis of the associated aperture, means for engaging said indexing pins and moving said chain stepwise, means adjacent said runs for feeding pivot pins into said apertures, means adjacent said runs for feeding chain links onto pivot pins supported in an anvil, spinning means for flaring the end of a pivot pin hub over a chain link thereon, said spinning means including a vertically movable revolving spinning head and means for centering a pivot pin beneath the spinning head including a pair of opposite holddown members movable with and adjacent said spinning head having toothed ends defining notches to fit over and engage the indexing pins opposite the pivot pin being flared, the apices of said notches being in alignment with said spinning head whereby an anvil will be moved to center a pivot pin beneath said spinning head as said holddown member is lowered into engagement with the indexing pins adjacent such pivot pin.

4. In a machine for assembling chain parts the combination comprising a table, an anvil chain having a run supported on said table, said anvil chain having a plurality of evenly spaced indexing pins extending outwardly of each of the opposite sides of said chain, and means for engaging said pins and pushing said anvil chain longitudinally and stepwise across said table in a predetermined direction, said means comprising an indexing arm mounted beneath said table for pivotal movement about a horizontal axis, said indexing arm being bifurcated and having a fork extending upwardly one on each of the opposite sides of said anvil chain run, an indexing finger pivotally mounted on the upper end of each of said forks and positioned to extend over the said anvil indexing pins on the corresponding side of said chain and in the direction of movement of said anvil chain, means on said fingers for engaging said indexing pins and effecting movement of said anvil chain upon movement of said fingers in one direction of said chain and means to effect pivotal oscillation of said arm.

5. In a machine for assembling chain parts the combination comprising a table, an anvil chain having a run supported on said table, said anvil chain having a plurality of evenly spaced indexing pins extending outwardly of each of the opposite sides of said chain, and means for engaging said pins and pushing said anvil chain longitudinally and stepwise across said table in a predetermined direction, said means comprising an indexing arm mounted beneath said table for pivotal movement about a horizontal axis, said indexing arm being bifurcated and having a fork extending upwardly one on each of the opposite sides of said anvil chain run, an indexing finger pivotally mounted on the upper end of each of said forks and positioned to extend over the said anvil indexing pins on the corresponding side of said chain and in the direction of movement of said anvil chain, each of said fingers having a projection in the lower side thereof defining an abrupt shoulder facing the free end of the finger to engage said indexing pins and effect movement of said anvil chain upon movement of said fingers in the direction of said free end thereof, said projection having a sloping surface facing the opposite direction to cause said fingers to ride up and over said indexing pins upon movement of said fingers in the opposite direction and means to effect pivotal oscillation of said indexing arm.

6. In a machine for assembling chain parts the combination comprising a table, an anvil chain having a run supported on said table, said anvil chain having a plurality of evenly spaced indexing pins extending outwardly of each of the opposite sides of said chain, and means for engaging said pins and pushing said anvil chain longitudinally and stepwise across said table in a predetermined direction, said means comprising a generally vertical lever member, means supporting said lever member beneath said table for pivotal movement at its upper end about a horizontal axis, an indexing arm mounted on the upper end of said lever member for limited pivotal movement about a horizontal axis, said indexing arm being bifurcated and having a fork extending upwardly one on each of the opposite sides of said anvil chain run, an indexing finger pivotally mounted on the upper end of each of said forks and positioned to extend over the said anvil indexing pins on the corresponding side of said chain and in the direction of movement of said anvil chain, each of said fingers having a projection in the lower side thereof defining an abrupt shoulder facing the free end of the finger to engage said indexing pins and effect movement of said anvil chain upon movement of said fingers in the direction of the said free end thereof, said projection having a sloping surface facing the opposite direction to cause said fingers to ride up and over said indexing pins upon movement of said fingers in the opposite direction, said indexing arm having a tongue extending downwardly from the connection of said arm to said lever, means for effecting swinging movement of said lever member through a predetermined arc, and resilient means operatively arranged between the lower end of said lever member and said tongue to cause said indexing arm normally to move with said lever member, said resilient means having a predetermined degree of resistance.

7. In a machine for assembling chain parts including a flat link plate having a pair of spaced pivot pin receiving openings therein, link plate feed means including a member having an upwardly directed horizontal surface for supporting said link plates with said openings directed perpendicularly to said member surface, a pair of dogs for releasably engaging the opposite ends of a link plate and holding said link plate between said dogs, said dogs each having an upwardly directed horizontal surface aligned with and substantially continuing said member surface for holding said link plate with said openings directed substantially perpendicular to said dog surfaces, means for pushing said link plate horizontally from said upwardly directed surface into position between said dogs and means for ejecting said link plate from between said dogs comprising a pusher block having a horizontal bottom surface mounted above said dog surfaces for vertical reciprocal movement between said dogs, a pair of guide pins protruding from said bottom surface of said pusher block, said guide pins being spaced a predetermined distance apart for engaging one in each of the said link plate openings upon downward movement of said pusher block to assure alignment of said chain link to a predetermined position as the same is moved downwardly from said dogs, and means for effecting reciprocation of said pusher block.

8. In a machine for assembling saw chain parts including a flat link plate having a pair of spaced pivot pin receiving openings therein, link plate feed means including a member having an upwardly directed horizontal surface for supporting said link plate with said openings directed perpendicularly to said member surface, a pair of dogs for releasably engaging and holding said link plate between said dogs, said dogs each having an upwardly directed horizontal surface aligned with and substantially continuing said member surface for holding said link plate with said openings directed substantially perpendicular to said dog surfaces, means pivotally supporting said dogs for rotation about horizontal axes, resilient means operatively arranged with said dogs to urge the same into engagement with the ends of said link plate positioned therebetween, and means for ejecting said link plate from between said dogs comprising a pusher block having a horizontal bottom surface mounted above said dog surfaces for vertical reciprocal movement between said dogs, a pair of vertical guide pins slidably mounted in said pusher block and protruding from said bottom surface thereof, said guide pins being spaced a predetermined distance apart for engaging one in each of the said link plate openings upon downward movement of said pusher block to assure alignment of said chain link to a predetermined position as the same is moved downwardly from said dogs, resilient means in said pusher block engaging said guide pins and urging the same outwardly from the lower surface of said pusher block, and means for effecting reciprocation of said pusher block.

References Cited in the file of this patent

UNITED STATES PATENTS

| | | |
|---|---|---|
| 330,951 | Wilkins et al. | Nov. 24, 1885 |
| 507,263 | Egge | Oct. 24, 1893 |
| 756,974 | Moon | Apr. 12, 1904 |
| 1,105,749 | Breitenstein | Aug. 4, 1914 |
| 1,766,139 | Myers | June 24, 1930 |
| 1,944,360 | Meyer | Jan. 23, 1934 |
| 2,340,171 | Boyer | Jan. 25, 1944 |
| 2,368,271 | St. Pierre | Jan. 30, 1945 |
| 2,503,365 | Vollet | Apr. 11, 1950 |
| 2,550,431 | Shaw | Apr. 24, 1951 |
| 2,661,940 | Rollins | Dec. 8, 1953 |
| 2,681,461 | Trimble | June 22, 1954 |
| 2,683,531 | Baehr | July 13, 1954 |
| 2,700,870 | Green | Feb. 1, 1955 |
| 2,757,822 | Cox | Aug. 7, 1956 |

FOREIGN PATENTS

| | | |
|---|---|---|
| 331,093 | Great Britain | June 26, 1930 |